United States Patent
Kruhöffer et al.

(10) Patent No.: US 10,670,076 B2
(45) Date of Patent: Jun. 2, 2020

(54) ROLLING BEARING HAVING A COATING

(71) Applicant: Schaeffler Technologies AG & Co. KG, Herzogenaurach (DE)

(72) Inventors: Wolfram Kruhöffer, Aurachtal (DE); Toni Blaß, Bergrheinfeld (DE); Bertram Haag, Uhlfeld (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/096,064

(22) PCT Filed: May 4, 2017

(86) PCT No.: PCT/DE2017/100376
§ 371 (c)(1),
(2) Date: Oct. 24, 2018

(87) PCT Pub. No.: WO2017/206981
PCT Pub. Date: Dec. 7, 2017

(65) Prior Publication Data
US 2019/0128327 A1 May 2, 2019

(30) Foreign Application Priority Data
Jun. 2, 2016 (DE) .......... 10 2016 209 695

(51) Int. Cl.
*F16C 33/58* (2006.01)
*F16C 33/62* (2006.01)
*F16C 19/06* (2006.01)

(52) U.S. Cl.
CPC ............ *F16C 33/585* (2013.01); *F16C 33/62* (2013.01); *F16C 19/06* (2013.01); *F16C 2204/40* (2013.01); *F16C 2223/30* (2013.01); *F16C 2360/31* (2013.01)

(58) Field of Classification Search
CPC ........ F16C 33/585; F16C 33/62; F16C 33/64; F16C 2223/30; F16C 2360/61
See application file for complete search history.

(56) References Cited

U.S. PATENT DOCUMENTS

| | | | | |
|---|---|---|---|---|
| RE35,860 E | * | 7/1998 | Ward | F16C 33/32 384/492 |
| 7,543,992 B2 | * | 6/2009 | Bruce | F16C 7/02 384/192 |
| 8,210,751 B2 | * | 7/2012 | Streit | F16C 33/62 384/492 |

(Continued)

FOREIGN PATENT DOCUMENTS

| | | |
|---|---|---|
| CN | 1871442 A | 11/2006 |
| CN | 101248283 A | 8/2008 |

(Continued)

*Primary Examiner* — James Pilkington
(74) *Attorney, Agent, or Firm* — Kevin L. Parks

(57) ABSTRACT

Rolling bearings and methods of making the same are disclosed. The rolling bearing may include an inner ring, an outer ring and rolling elements arranged radially or axially between the inner ring and the outer ring. A coating may be formed at least partially on the inner ring, and/or on the outer ring, and/or on the rolling elements, wherein the coating is formed predominantly from tungsten and is configured to prevent white etching cracks. The rolling bearing may be used in a wind turbine.

11 Claims, 1 Drawing Sheet

(56) References Cited

U.S. PATENT DOCUMENTS

| | | | | |
|---|---|---|---|---|
| 8,801,292 B2* | 8/2014 | Kobayashi | .............. | F16C 19/26 |
| | | | | 384/463 |
| 2010/0261034 A1* | 10/2010 | Cardarelli | ............... | A61L 27/42 |
| | | | | 428/615 |
| 2017/0021417 A1* | 1/2017 | Martin | .................. | B22F 3/1028 |

FOREIGN PATENT DOCUMENTS

| | | |
|---|---|---|
| CN | 101408225 A | 4/2009 |
| CN | 102678740 A | 9/2012 |
| CN | 105587771 A | 5/2016 |
| DE | 102007055575 A1 | 6/2009 |
| DE | 102013112868 A1 | 5/2015 |
| EP | 2573195 A1 | 3/2013 |
| JP | 2005048852 A | 2/2005 |

* cited by examiner

ROLLING BEARING HAVING A COATING

CROSS-REFERENCE TO RELATED APPLICATIONS

This application is the U.S. National Phase of PCT Appln. No. PCT/DE2017/100376 filed May 4, 2017, which claims priority to DE 10 2016 209 695.8 filed Jun. 2, 2016, the entire disclosures of which are incorporated by reference herein.

TECHNICAL FIELD

The disclosure relates to a rolling bearing, such as for a wind turbine, comprising an inner ring, an outer ring and rolling elements arranged radially or axially between the inner ring and the outer ring. The area of application of the disclosure extends primarily to wind turbines. However, other areas of application for the rolling bearing are also conceivable. Examples are motor vehicle applications or industrial applications.

BACKGROUND

One phenomenon which has a negative effect on the reliability of rolling bearings are white etching cracks or WECs (the term used predominantly among technical experts even those who are German speakers). White etching cracks are changes in the microstructure of the material which form below the bearing surface. These can propagate as far as the surface under the influence of various external loads. As a result, pits or flaked areas may form and fracture of the inner or outer ring and thus premature failure of the bearing concerned may even occur. White etching cracks occur both in fully hardened and in case-hardened rolling bearings. The reasons for the formation of white etching cracks have not yet been fully explained. However, according to the current state of knowledge, additional stresses in the form of dynamic loads and/or hybrid friction and/or electrical phenomena are preconditions for the formation of white etching cracks. In particular, increased hydrogen absorption into the boundary layer of the material at the point of rolling contact is regarded as a fundamental cause of the formation of white etching cracks. Hydrogen formation and absorption are caused by the additional stress due, for example, to high frictional stress in the rolling surfaces and/or due to additional electric loads. Such white etching cracks are described in EP 2 573 195 A1, for example.

To increase resistance to white etching cracks in a rolling bearing, EP 2 573 195 A1 proposes the provision of a compound layer on the bearing surface of the rolling bearing. In this case, the compound layer has a lower yield stress than the remainder of the material of the rolling bearing. This is accomplished by heating the rolling bearing at a certain temperature for a certain time and bringing the bearing surface into contact with a chemical additive.

SUMMARY

It is one object of the disclosure to further develop a rolling bearing and, in particular, to increase the resistance of the rolling bearing to white etching cracks.

The rolling bearing according to the disclosure may be provided for a wind turbine and comprises an inner ring, an outer ring and rolling elements arranged radially or axially between the inner ring and the outer ring, wherein a coating for preventing white etching cracks is formed at least partially on the inner ring and/or on the outer ring and/or on the rolling elements, wherein the coating is formed predominantly from tungsten. In other words, the coating may consist substantially of pure tungsten or from a tungsten alloy. In this case, a coating composed of a single, homogeneous layer is provided directly on the inner or outer ring. If the coating is formed from a tungsten alloy, tungsten is the predominant component in the alloy composition relative to the other alloying elements.

On the one hand, the coating composed predominantly of tungsten passivates the surface and, in particular, prevents the formation of diffusible hydrogen. Moreover, a barrier effect of the tungsten prevents or at least greatly restricts diffusion of hydrogen into the surface of the inner ring and/or of the outer ring and/or of the rolling elements. Furthermore, the tungsten coating makes it possible to increase the surface hardness and rolling strength of the inner ring and/or of the outer ring and/or of the rolling elements.

In one embodiment of the disclosure, the coating is impermeable to gas and has no open pores. In this case, the coating is, in particular, impenetrable to atomic hydrogen. Any enclosed pore volume that may be present in the coating is preferably less than or equal to 5% by volume of the total volume of the coating.

A layer thickness of the coating is preferably in a range of from 0.5 µm to 30 µm. As a particular preference, the layer thickness of the coating is in a range of from 0.5 µm to 15 µm.

If the coating is formed from a tungsten alloy, this tungsten alloy preferably comprises at least one alloying element from the group comprising titanium, zirconium, molybdenum, hafnium, cobalt, nickel, copper, iron, vanadium and carbon.

A tungsten content of the coating is preferably in a range of from 50% by mass to 100% by mass. As a particular preference, the tungsten content of the coating is in a range of from 75% by mass to 100% by mass. In particular, the tungsten content of the coating is in a range of from 85% by mass to 100% by mass.

According to one embodiment, the inner ring and/or the outer ring and/or the rolling elements are subjected to a heat treatment, i.e. before the coating is applied thereto. In particular, the inner ring and/or the outer ring and/or the rolling elements are fully hardened, case-hardened or carbonitrided. In the case of carbonitriding, it is predominantly carbon but also nitrogen which is diffused into the boundary layer of the inner ring and/or of the outer ring and/or of the rolling elements, thereby increasing surface hardening and selectively modifying the surface microstructure.

As a basic material for the inner ring and/or the outer ring and/or the rolling elements, use is preferably made of a rolling bearing steel, which is, in particular, fully hardened or thermally surface-hardened or thermochemically surface-hardened.

According to one embodiment, the coating is formed in a functionally relevant way on a race and/or on a flange of the outer ring and/or of the inner ring. A selectively partial coating of the inner ring and/or of the outer ring can preferably be made possible by covering those surfaces on the inner ring and/or the outer ring which are not to be coated. As an alternative, it is also conceivable to coat the entire surface of the inner ring and/or of the outer ring and/or of the rolling elements.

According to a method according to the disclosure, the inner ring and/or the outer ring and/or the rolling elements are initially heat-treated and then at least partially coated to prevent white etching cracks, wherein the coating is formed predominantly from tungsten.

There may be no mechanical finish-machining of the coating formed. If a run-in phase of the rolling bearing according to the disclosure can be used as a smoothing phase to smooth the coating, it has proven useful if the coating has a mean roughness of Ra<4 μm. If it is not possible to use a run-in phase of the rolling bearing according to the disclosure as a smoothing phase to smooth the coating and also no mechanical finish-machining of the coating is intended, it has proven useful if the coating has a mean roughness of Ra<0.3 μm.

The hardness of the coating formed may be below 1000 HV, in particular in a range of from 300 HV to 800 HV. Thus, the hardness of the coating before the rolling elements roll over it in the rolling bearing can be below 600 HV. After the rolling elements of the rolling bearing have rolled over the coating, the hardness of the coating can still be below 800 HV.

According to one embodiment, the coating is formed by an ionic liquid. Ionic liquids are salts which have a melting point below 100° C. (under normal conditions). An ionic liquid comprises cations and anions. A large number of different organic ions are envisaged as cations, e.g. imidazolium, pyridinium, tetraalkylammonium and tetraalkylphosphonium. On the other hand, halides, nitrates or even relatively large organic anions are envisaged as anions.

According to another embodiment, the coating is formed by a plasma coating method. In the case of thermal plasma coating methods, a coating material is ionized by generating a high temperature of several thousand degrees Celsius and thus converted to the plasma state. For this purpose, an electric arc is preferably used. By the high thermal energy, powdered tungsten can preferably be vaporized in order to deposit the vapor as a thin layer on the surface of the inner ring and/or of the outer ring and/or of the rolling elements.

According to another embodiment, the coating is formed by a PVD or CVD method. In other words, the coating is applied by a PVD (physical vapor deposition) or CVD (chemical vapor deposition) method. In the PVD method, particles are separated from a target material by sputtering, for example, and transferred in a plasma to the surface of the inner ring and/or of the outer ring and/or of the rolling elements. In the CVD method, layer deposition takes place at the heated surface of the inner ring and/or of the outer ring and/or of the rolling elements owing to a chemical reaction from a gas phase.

However, a combination of the abovementioned methods (here: formation of the coating by ionic liquid; formation of the coating by plasma coating; formation of the coating by a PVD method; formation of the coating by a CVD method) to form the coating is also possible. Thus, the coating can be composed of at least two partial layers which are formed one on top of the other and/or one next to the other by different deposition methods, depending on the location of use. Depending on the coating material used, this can provide advantages in respect of the desired gas impermeability of the coating, the adhesion thereof on the base material to be coated and the roughness thereof.

BRIEF DESCRIPTION OF THE DRAWINGS

Further measures that improve the disclosure are explained in greater detail below together with the description of an example embodiment of the disclosure with reference to the two figures, of which

DETAILED DESCRIPTION

Figure 1:
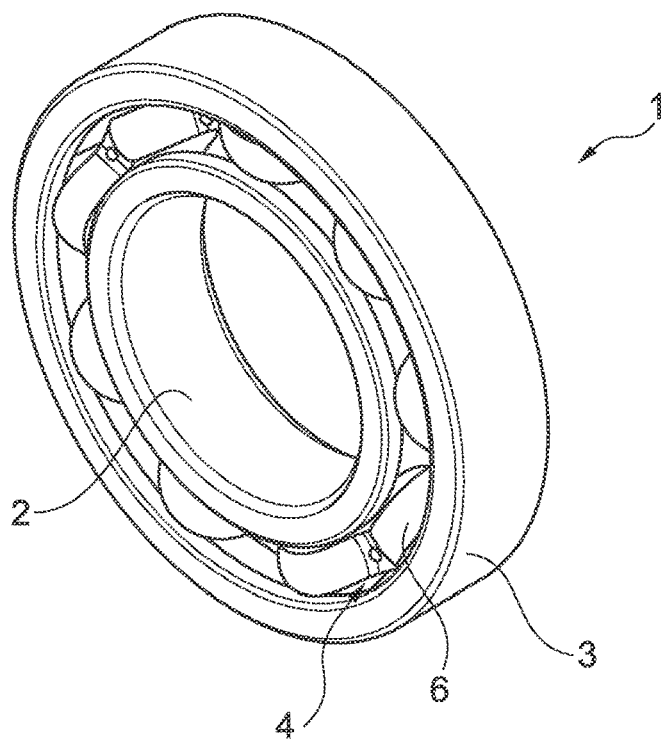
FIG. 1 shows a schematic perspective view of a rolling bearing according to the disclosure.

According to FIG. 1, a rolling bearing 1 according to the disclosure, e.g., for a wind turbine (not shown here), has an inner ring 2, an outer ring 3 and rolling elements 4 arranged radially between the inner ring 2 and the outer ring 3. The rolling elements 4 are guided by a cage 6. By way of example here, the rolling bearing 1 is designed as a deep groove ball bearing. Thus, the rolling elements 4 are designed as balls. However, in very general terms, it can be a ball bearing, cylinder roller bearing, needle bearing, spherical or self-aligning roller bearing, toroidal roller bearing etc. here.

Figure 2:
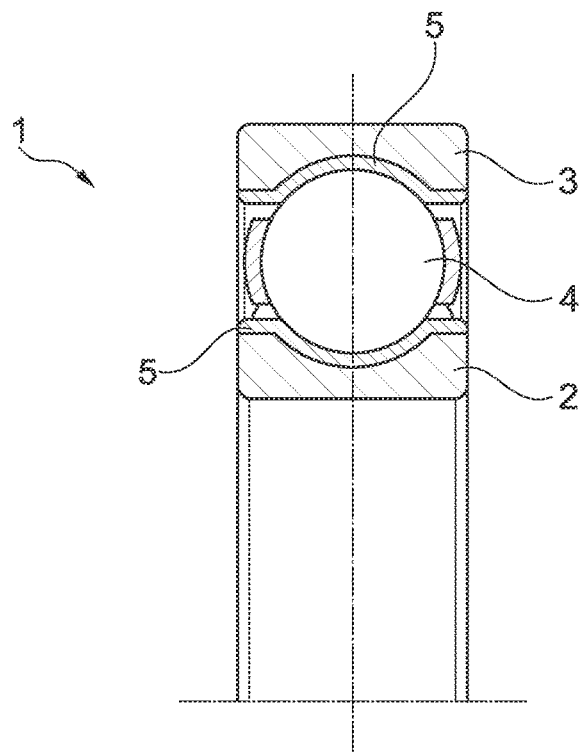
FIG. 2 shows a schematic section through the rolling bearing according to the disclosure in accordance with FIG. 1.

According to FIG. 2, a respective coating 5 to prevent white etching cracks is formed partially on the inner ring 2 and partially on the outer ring 3, wherein the coating 5 is formed predominantly from tungsten. A layer thickness of the coating 5 may be 5 μm. Furthermore, a tungsten content of the coating 5 is 90% to 100% in this example. In this embodiment, the coating 5 is formed only on an inner circumferential surface of the outer ring 3 and on an outer circumferential surface of the inner ring 2. Furthermore, the inner ring 2, the outer ring 3 and the rolling elements 4 have been subjected to a heat treatment, which has been carried out before the application of the coating 5.

The disclosure is not restricted to the illustrative embodiment described above. Further illustrative embodiments or possible further developments of the disclosure will become apparent especially from the claims and the description. For example, the inner ring 2 and the outer ring 3 can have a full coating 5 composed predominantly of tungsten. It is furthermore also conceivable to coat the rolling elements 4 with the coating 5 composed predominantly of tungsten. Furthermore, the coating 5 can also have a different layer thickness or a tungsten content in a range of from 50% by mass to less than 100% by mass.

LIST OF REFERENCE SIGNS 1 rolling bearing
2 inner ring
3 outer ring
4 rolling elements
5 coating
6 cage

The invention claimed is:

1. A rolling bearing, comprising:
an inner ring;
an outer ring;
rolling elements arranged radially or axially between the inner ring and the outer ring; and
a coating formed at least partially on at least one of the inner ring, the outer ring, or the rolling elements, wherein:
the coating comprises a single, homogeneous layer, impermeable to gas, the coating is formed predominantly from pure tungsten, or a tungsten alloy with a composition that is primarily tungsten relative to other alloying elements; and
the at least one of the inner ring, the outer ring, or the rolling elements is made from a rolling bearing steel that is fully hardened, thermally surface-hardened, or thermochemically surface-hardened.

2. The rolling bearing as claimed in claim 1, wherein a layer thickness of the coating is in a range of from 0.5 μm to 30 μm.

3. The rolling bearing as claimed in claim 1, wherein a tungsten content of the coating is in a range of from 50% by mass to 100% by mass.

4. The rolling bearing as claimed in claim 1, wherein the coating is formed only partially on the inner ring and the outer ring.

5. The rolling bearing as claimed in claim 1, wherein a layer thickness of the coating is in a range of from 0.5 μm to 15 μm.

6. The rolling bearing of claim 1 wherein any enclosed pore volume in the coating is less than or equal to 5% by volume of the total volume of the coating.

7. A method for the at least partial coating of at least one of an inner ring, an outer ring or rolling elements of a rolling bearing as claimed in claim 1, wherein the at least one of the inner ring, the outer ring, or the rolling elements is initially fully hardened, thermally surface-hardened, or thermochemically surface-hardened and then at least partially coated.

8. The method as claimed in claim 7, wherein the coating is formed at least partially by an ionic liquid.

9. The method as claimed in claim 7, wherein the coating is formed at least partially by a plasma coating method.

10. The method as claimed in claim 7, wherein the coating is formed at least partially by a PVD or CVD method.

11. The method as claimed in claim 7, wherein the coating is formed by plasma coating, CVD, PVD, ionic liquid or combined methods.

* * * * *